Figure 1:
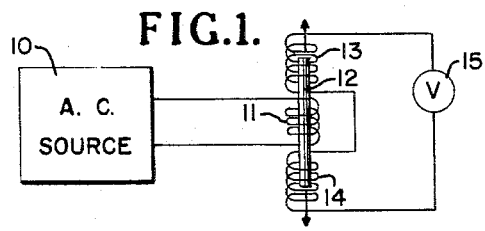

Jan. 18, 1966     W. W. WILLIAMS     3,229,514

TORQUE MEASURING DEVICE

Filed Oct. 15, 1962

INVENTOR
WILLIAM W. WILLIAMS

BY *O. H. Hodges*

ATTY.

United States Patent Office 3,229,514
Patented Jan. 18, 1966

3,229,514
TORQUE MEASURING DEVICE
William W. Williams, Newport, R.I., assignor to the United States of America as represented by the Secretary of the Navy
Filed Oct. 15, 1962, Ser. No. 230,770
7 Claims. (Cl. 73—136)
(Granted under Title 35, U.S. Code (1952), sec. 266)

The invention described herein may be manufactured and used by or for the Government of the United States of America for governmental purposes without the payment of any royalties thereon or therefor.

This invention relates to a device for measuring the torque produced on a member, and more particularly to a torque measuring device for accurately determining dynamic or transient torques in the range of a fraction of an ounce-inch on a continually rotating member.

Strain gages are normally adequate for measuring stationary torques on a member, but they suffer from two disadvantages in measuring the torque of rotating members when that torque is in the low value range of ounce-inches. First, the operating stresses at the surface of the shaft due to torsion alone are too small for accurate measurement by the strain gages; the strain gages are best employed in measuring considerably higher torsional strains. Due to the small amount of stress which will be sensed by the strain gages in these circumstances, the voltage output from them will be very small in magnitude. Secondly, the small voltages from the strain gages cannot be conveniently transferred through slip rings. The circumference of even the best slip rings is somewhat irregular and will therefore not present a uniform contact with the pick up members throughout a full rotation; thus the voltages received from the slip rings might vary considerably from the very small voltages sensed by the strain gages. The output of the strain gages might be increased by decreasing the cross-sectional area of the shaft, which would increase the operating stresses at the surface thereof; but this corrective measure would tend to alter the dynamic response of this system and weaken the shaft mechanically.

Therefore, it is an object of this invention to provide an improved torque measuring device for measuring the torque forces on continually rotating members.

Another object of this invention is to provide an improved torque measuring device for measuring low values of torque on a continually rotating member wherein the low values of torque produce sufficiently large electrical signals for accurate transmission through slip ring connections.

A further object of this invention is to provide a torque measuring device which employs a linear variable differential transformer to measure torque values.

Various other objects and advantages will appear from the following description of one embodiment of the invention, and the most novel features will be particularly pointed out hereinafter in connection with the appended claims.

Figure 3:
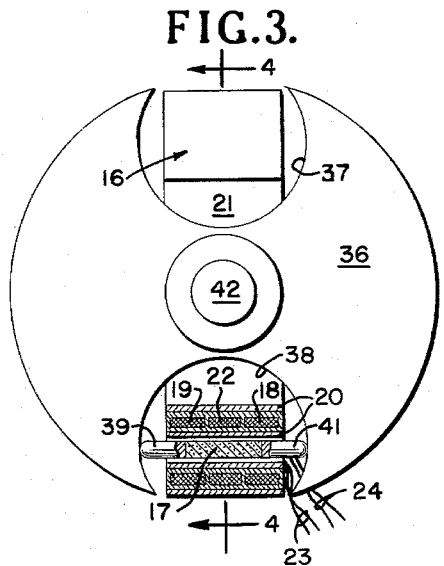
Figure 2:
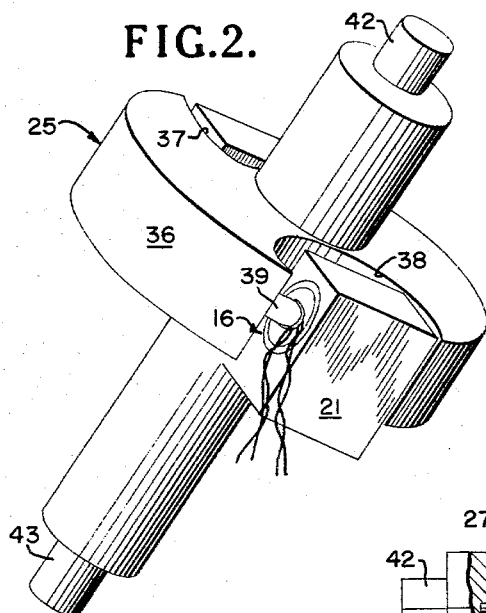
Figure 4:
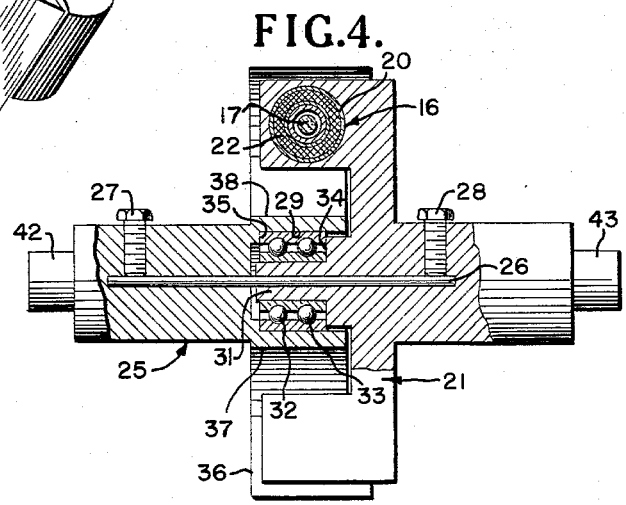
Figure 5:
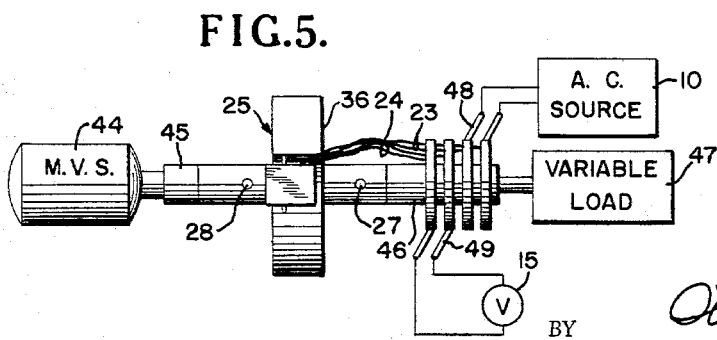

In the drawing:
FIG. 1 is a circuit diagram of the essential elements of a linear variable differential transformer, which is used as a sensing device of the present invention;
FIG. 2 is a perspective view of the torque measuring device according to the invention;
FIG. 3 is an end view of the torque measuring device showing a partial section taken through the center of the linear variable differential transformer;
FIG. 4 is a section view partially broken away of the torque measuring device taken through the axis of rotation of the device of FIG. 2; and FIG. 5 is a view of the torque measuring device according to the present invention along with the associated circuitry.

One of the essential elements of this invention is a linear variable differential transformer, which is a device commonly used for obtaining an electrical output indicative of the translational movement of a magnetic core. A basic understanding of the operation of a linear variable differential transformer may be obtained by reference to the circuit of FIG. 1. A source of alternating current 10 is connected to a primary winding 11 which surrounds a magnetic core 12. The turns of the primary winding 11 are evenly distributed along the axial direction of the core 12 in order to produce as uniform a field as possible at the ends of the winding 11. Also arranged adjacent to and surrounding the core 12 are a pair of secondary windings 13 and 14 which have equal number of turns but are connected in series opposing relationship. The magnetic core 12 provides a low reluctance magnetic path between the primary winding 11 and each of the secondary windings 13 and 14. Thus the alternating electromagnetic field produced by the primary winding 11 is linked by the magnetic core 12 to the secondary windings 13 and 14.

The magnetic core 12 is moveable in its axial direction, as indicated by the arrows, to vary the amount of linkage between the primary winding and both of the secondary windings. As the core is moved in the direction of the secondary winding 13 more of the alternating field will be linked with that secondary winding and less will be linked to the winding 14; thus a greater voltage will be induced in the secondary winding 13 than in the secondary winding 14. An alternating current voltmeter 15 is connected in series with the two secondary windings to provide an indication of the resultant output voltage of the two secondary windings 13 and 14.

The operation of the linear variable differential transformer is such that when the magnetic core 12 has its center positioned midway between the windings 13 and 14, the field from the primary winding 11 is normally linked equally with both the secondary windings. Since the secondary windings 13 and 14 are connected in series opposing relation the resulting voltage will be zero and the voltmeter 15 will register no voltage. When, however, the core is moved in either direction from this center position, the flux linked to one of the secondary windings will be increased while the flux linked to the other of the secondary windings will be decreased. This will produce a resultant voltage which will be indicated by the alternating current voltmeter 15, as aforementioned. The indication of the voltmeter 15 will be a measure of the distance by which the core 12 has been moved from its center position. These transformers can be accurately constructed to produce relatively large voltage indications of relatively small movements of the core 12.

The detailed construction of a linear variable differential transformer is more clearly illustrated by reference to FIGS. 3 and 4, in which the actual device is shown in sectional views. A cylindrical magnetic core 17 is slideably disposed within a cylindrical opening formed by the center hole of the windings of the transformer. A pair of annularly wound secondary windings 18 and 19 are encased in any nonmagnetic insulating material 20, such as a thermoplastic, and disposed tightly within a hole drilled through the rigid metallic member 21. Also within the cylindrical hole is the primary coil 22 also annularly wound and encased in nonmagnetic insulating material 20. The primary coil 22 and the two secondary coils 18 and 19 located on either side thereof are axially aligned and their inside surfaces form the annular opening in which the magnetic core 17 is disposed. The primary coil 22 is connected to a source of alternating current by means of the leads 23, as was previously described. The two secondary windings 18 and 19 are connected in series opposing relation and also connected through the leads 24 to an appropriate external indicating voltmeter, slip rings being provided in each of these circuits as will more clearly appear as the description proceeds.

Referring now particularly to FIG. 4, the entire torque measuring device may be seen to comprise a pair of rigid members 21 and 25 which are tightly attached to two different points on a torsion rod 26. The torsion rod 26 is of metallic or other material, which has predetermined twist characteristics for a given magnitude of torsional strain placed upon the rod; this allows the device to be accurately calibrated. Each of the rigid members 25 and 21 is constructed of a light, relatively inflexible material such as a cast aluminum alloy.

The rigid member 25 is constructed for attachment to the torsion rod 26 to establish a first reference point thereon. The rigid member 25 has a cylindrical clamping section which receives the torsion rod 26 in a cylindrical hole drilled at the center of rotation and tightly clamps the rod by means of a threaded clamping screw 27 inserted through a radial threaded hole therein.

The rigid member 21 establishes a second reference point on the torsion rod 26. The torsion rod 26 is in similar fashion inserted into a drilled hole in a cylindrical clamping section at the center of rotation of the member 21 and clamped by means of a clamping screw 28 inserted through a similarly threaded hole. The member 25 has a recessed cylindrical portion 29 along the axis of rotation for receiving a cylindrical protruding portion 31 of the rigid member 21. A pair of ball type ring bearings 32 and 33 fit around the protruding portion 31 within the recessed cylindrical hole 29 to provide a low friction, rotating contact between the two clamping sections. The annular shoulder 35 at the back part of the cylindrical hole 29 and the annular shoulder 34 formed on the protruding portion 31 serve to confine the ball bearing comprising balls 32 and 33 in the correct axial position between the two rigid members.

A large circular collar 36 integral with the clamping section of rigid member 25 extends outward and has a pair of identical symmetrical grooves 37 and 38 cut therein opposite each other. The grooves 37 and 38 are quite large and are cut from the radial surface of the collar 36 almost into the body of the cylindrical clamping portion. The core 17 must be held within the groove 38 so that as the collar portion 36 revolves about its axis the core will also move. For this purpose the core 17, which is of a total length less than the length of the opening provided by the three coils of the transformer, has integrally attached to the ends thereof core extensions 39 and 41. These core extensions 39 and 41 are of a nonmagnetic material, such as a rigid thermoplastic, and are sealed to the ends of the core by means of adhesive or any other suitable means.

The rigid member 31, which is clamped to the torsion rod 26 at the other end thereof, has a pair of radially extending portions integral therewith. These radially extending portions are essentially L-shaped with the radial portion first extending outwards from the clamping section with the other portion of the L-shape extending forward in a direction parallel to the axis of rotation and into the grooves 37 and 38 of the collar of rigid member 25. One of the L-shaped sections rigidly holds the windings of the linear variable differential transformer 16 in a central position around the magnetic core 17 when the rod 26 is not stressed.

Thus it may be seen that the collar portion 36 with its attending groove 38 will be displaced relative to the L-shaped section of the rigid member 21, which holds the windings of the transformer 16, when the torsion rod 26 is twisted by torsional strains. In operation, when a driving force is applied to one rigid member and a load is attached to the other rigid member, the calibrated torsion rod 26 is subjected to a torsional twisting force during rotation of the members. The angular twist of the torsion rod 26 will be proportional to the torsional force applied thereto. As the torsion rod twists, the rigid member 21 will rotate relative to the rigid member 25 thereby causing the core 17 to be moved from its original central position in the cylindrical opening provided by the coils of the transformer 16. As the magnetic core 17 moves it changes the linkage between the primary winding 22 and each of the secondary windings 18 and 19 and a voltage indication is obtained at the output leads 24, as previously explained.

Twisting of the torsion rod 26 in the low torsional strain pound-inches will be extremely slight, and the amount of twist can be controlled by choice of the material used for the torsion rod 26. The linear variable differential transformer 16 indicates small changes in the axial position of the core 17 caused by twist of the torsion rod. For the best accuracy, the movement of the core 17 should be confined to a purely translational movement along its axial length; however, it can be seen that rotational movement of the rigid member 21 with respect to the rigid member 25 will also tend to change the axial alignment of the core 17 within the coil structure.

For small amounts of twist the axial alignment change will be very slight in its effect, mostly negligible; but for larger rotational movement the accuracy of the device might be severely impaired. Therefore, it is necessary to shape the groove 38 to provide axial movement of the core without forcing a change of its axial alignment.

The geometry of the mathematical development of a formula describing the surface of the groove 38 will not be treated in detail but should be obvious to anyone skilled in mathematical analysis. The shaping of the groove which is necessary to provide the desired axial movement is expressed by the equation:

$$y = \frac{1d}{x} - 1 + (d^2 - x^2)^{1/2}$$

Where the quantity 1 represents the radial distance from the axis of rotation of the torsion rod 26 to the center of the core 17 when the rigid member 21 is aligned in its "no torque" or original position with its center coinciding with the center of the groove 38. Quantity $d$ represents the distance from the center of the core 17 to each of the ends of the core extensions 39 and 41 which are in contact with the edges of the groove 38. The orthogonal quantities $x$ and $y$ are measured in the normal manner in relation to the illustration of FIG. 3 with the point of origin being considered as the center of the core 17 in its original or "no torque" position. The quantity $x$ is the distance from the center of the magnetic core 17 in either direction along the axis of the core 17 in its original position. The quantity $y$ is measured in the vertical direction from the axis of the core and has a positive sign for vertical distances away from the axis of rotation and a negative sign towards the axis of rotation. It is obvious that this equation can only describe a portion of the groove surface. Thus the surface of the groove follows the shape described by this equation only for those groove surfaces which the ends of the core extension will touch at the extreme limits of relative rotation, which may be expected from the operation of this device. With the groove shaped in this manner, the ends of the core extension 39 and 41 will always be in contact with their respective sides of the groove for any contemplated rotational alignment of the two members. Changes in axial alignment are thereby prevented and positive movement of the core within the coils is assured for each change in the relative angular alignment of the two rigid members.

It is to be noted that the circular section of the collar 36 together with the extension of the portions of the rigid member 21 into the grooves provides an overall design in which the weight of the rigid members is fairly evenly distributed about the shaft so that extraneous forces caused by the rotation of unevenly distributed weight are minimized.

In FIG. 5, the torque measuring device is shown connected into a mechanical rotational system for practical use. A variable speed motor 44 is connected through a coupling 45 to the shaft extension 42 of the rigid member 25. The other shaft extension 43 has a slip ring section 46 attached thereto by any convenient method, and from there a shaft extends to a variable friction load 47 of any type provided by the art. Alternating current is fed from the source 10 through a pair of constant pressure brushes 48 to the surfaces of a pair of slip rings on the slip ring section 46. This pair of slip rings are connected by means of the leads 23 to the primary coil 22 of the linear variable differential transformer 16 to provide the alternating current for operation. The leads 24 from the interconnected secondary coils 18 and 19 are connected to the other pair of slip rings on the slip ring section so that the output voltage therefrom is fed through another pair of constant pressure brushes 49 to an appropriately calibrated voltmeter 15. The voltmeter 15 may be provided with a calibrated scale to read torque directly in accordance with the previously determined twist characteristics of the torsion rod 26. The torque measuring device may be used either for practical or experimental purposes. The device need merely be inserted as a portion of the shaft carrying the rotational movement from a driving source to the load.

The present torque measuring device of this invention provides an extremely sensitive torque measurement with a relatively simple construction which is easily and inexpensively produced.

It will be understood that various changes in the details, which have been herein described and illustrated in order to explain the nature of the invention, may be made by those skilled in the art, within the principle and scope of the invention as expressed in the appended claims.

What is claimed is:

1. A torque measuring device comprising an elongated torsion rod,
   first and second rigid members attached to different ends of said torsion rod,
   a linear voltage differential transformer having an annularly wound primary winding with a pair of series opposing annularly wound secondary windings in axial alignment therewith and on either side of said primary winding and a magnetic core movable along the axes of said windings within the annular openings provided thereby,
   said primary and secondary windings being connected to said first rigid member and said core being connected to said second rigid member for relative movement between said core and said windings due to the torsional displacement of the ends of said rod and wherein said first rigid member holds said windings with their axes tangential to a radius of the torsional displacement, and said second rigid member holds said core for relative movement along the axes of said windings,
   a source of alternating current connected to said primary winding to produce an alternating magnetic field coupled through said core to each of said secondary windings, whereby the voltage across said secondary windings is proportional to the torsional force on said rod.

2. In a device for measuring the torsional displacement of two axially spaced points on a gauged torsion rod, the combination comprising
   a rigid circular collar with a radial groove therein connected to said rod at one of said points,
   a second rigid member connected to said rod at the other of said points and having a portion extending into said groove,
   an elongated magnetic core means having its ends touching the surfaces of said groove,
   and magnetic circuit means connected to said second rigid member,
   annularly wound coils encircling said core means, said coils being supported by said portion extending into said groove,
   whereby torsional displacement of the two axially spaced points on said rod produces relative movement between said coils and said magnetic core means, and means associated with said coils for measuring the movement of said core when suitably energized.

3. The combination of claim 2 wherein said coils are wound about said core means with the axes of said coils corresponding to the axis of said core means.

4. The combination of claim 3 wherein said groove is shaped to provide movement of said core means only along the axes of said coils.

5. The combination of claim 2 wherein said coils comprise a primary and a pair of secondary windings on each side of said primary, said windings being arranged concentric with the axis of said core means, whereby relative movement of said core means to said windings varies the magnetic path between said primary and each of said secondary windings.

6. The combination of claim 5 wherein said means for measuring comprises a source of alternating current connected to said primary winding, and a voltage measuring means connected to said secondary windings.

7. The combination of claim 6 wherein said secondary windings are connected in series opposing relation.

References Cited by the Examiner
UNITED STATES PATENTS

| | | | |
|---|---|---|---|
| 2,921,298 | 1/1960 | Jackson | 340—199 |
| 2,942,476 | 6/1960 | Turner | 73—517 |
| 2,949,029 | 8/1960 | Bayles et al. | 73—136 |

FOREIGN PATENTS

| | | |
|---|---|---|
| 215,986 | 5/1924 | Great Britain. |

RICHARD C. QUEISSER, *Primary Examiner.*

JOSEPH P. STRIZAK, *Examiner.*

C. A. RUEHL, *Assistant Examiner.*